Oct. 26, 1926.

A. S. MACDONALD 1,604,925

FLEXIBLE JOINT

Filed August 3, 1923

WITNESS
Gustav Genzlinger

INVENTOR
Angus S. Macdonald

BY
Synnestvedt & Lechner
ATTORNEYS

Oct. 26, 1926.

A. S. MACDONALD 1,604,925

FLEXIBLE JOINT

Filed August 3, 1923  5 Sheets-Sheet 2

WITNESS
Gustav Genzlinger

INVENTOR
Angus S. Macdonald
BY
ATTORNEYS

Oct. 26, 1926.

A. S. MACDONALD 1,604,925

FLEXIBLE JOINT

Filed August 3, 1923     5 Sheets-Sheet 4

WITNESS
Gustav Genzlinger

INVENTOR
Angus S. Macdonald
BY
ATTORNEYS

Patented Oct. 26, 1926.

1,604,925

UNITED STATES PATENT OFFICE.

ANGUS S. MACDONALD, OF GREAT NECK, NEW YORK, ASSIGNOR, BY MESNE ASSIGNMENTS, TO SPICER MANUFACTURING COMPANY, OF SOUTH PLAINFIELD, NEW JERSEY, A CORPORATION OF VIRGINIA.

FLEXIBLE JOINT.

Application filed August 3, 1923. Serial No. 655,410.

My invention relates to flexible joints for torque transmission, and is particularly useful in automotive propeller shaft assemblies, to take care of misalignment or variation in the relations of parts. I aim to provide a simple, effective, durable, and inexpensive type and construction of joint for such purposes. My invention is especially concerned with flexible structures for such joints and their fabrication, as well as with the other parts of the joint and with the interrelations and co-ordination of various parts.

A type of flexible joint very extensively used at the present time comprises a pair of three-armed "spiders" connected to the driving and driven shafts, and a flexible disc member interposed between the spiders and bolted to the feet of each in alternation. Ordinarily, the flexible member of such a joint consists of one or more annular discs cut or punched out of heavy sheet material, —a procedure involving considerable waste of the material. This disc material is composed of layers of basket-weave cotton duck, or canvas, calendered with friction material (rubber) and vulcanized together. Such discs depend on the reinforcing fabric for strength, and on the rubber mainly to hold the fabric cords or threads together and to transmit and distribute the stresses amongst them. Large spider feet and bolt heads are provided, and also washers between the discs (where several discs are used), in order to clamp the discs laterally and distribute the stresses over as wide areas as possible.

With such a construction, nevertheless, the stresses are quite irregularly distributed, and the strength elements (the cords or threads of the fabric) are poorly disposed to develop and maintain their resistance to stress. For, in the first place, many of the cords or threads are interrupted at the bolt holes, so that they can be of service only in so far as short lengths at their ends can be effectively gripped by compression of the rubber under the corresponding bolt heads, etc. Secondly, however the bolt holes may be arranged relatively to the weave of the fabric, the lines of stress from bolt hole to bolt hole cannot possibly have the most favorable relation to all the cords all the way around the joint. Thirdly, the cords of each fabric layer make a large angle with one another (usually about a right angle), so that by their relative movement in service (under the lateral flexure and other distortions to which the flexible member is subjected) they tend to saw one another in two at all intersections,—and the like, indeed, may be more or less the case as between cords in adjacent fabric layers. Fourthly, under service conditions the disc material is always partly in tension and partly in compression; and the latter causes rapid deterioration of the disc structure, which is but ill adapted to endure compressive stress. Also, the joint is subject to whipping or "running out" (as it is termed) at high speeds, owing to its lack of direct resistance to unbalanced centrifugal forces.

Through my present invention, these and other drawbacks can be obviated, and various important advantages realized. The preferred embodiments of the invention here shown and described give excellent dynamic balance, and are substantially free from whipping or "running out". They afford great range or freedom for endwise axial variation and movement between the interconnected parts. They present great uniformity as regards stresses and effective strength in the flexible structure; and this structure is free from compression, sawing action in its strength material, or other specially injurious effects. The strength elements are so disposed as not only to take the stress to the best advantage, but also to reinforce one another effectually and to afford ample resistance against side pressure. The strength elements need not be interrupted by bolt holes, and practically no material at all need be wasted in making up the flexible structure. The flexible structure can be constructed as a disc of rubberized fabric without any of the disadvantages of the ordinary rubberized canvas disc. In action, the whole of this structure works in unison. All the strength elements take substantially the same load, and are stressed the same way all the time. Accordingly, the joint is well adapted to transmit even very heavy torque.

In the drawings.

Fig. 12 is a fragmentary perspective view of a reinforcing or anchorage device for the flexible structure or member.

Figure 1:
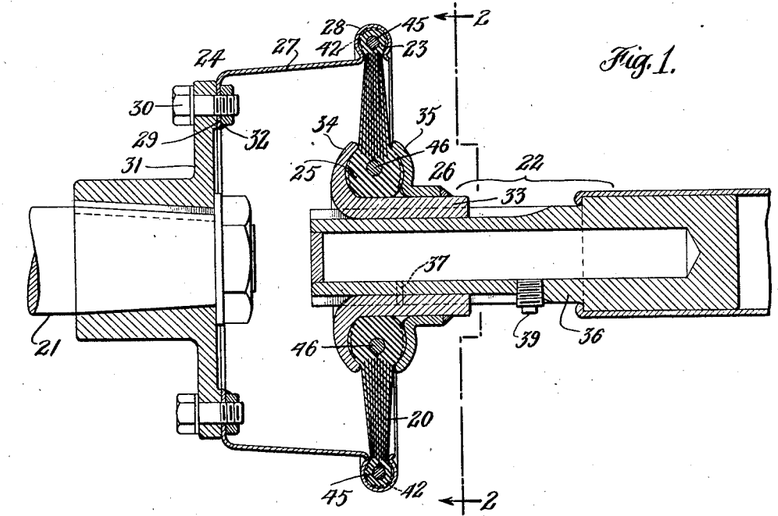
Fig. 1 shows an axial section through a joint conveniently embodying my invention.

As shown in Fig. 1, my joint comprises a disc-like flexible structure or member 20 for coupling the driving and driven shaft sections 21 and 22 of an automobile propeller assembly, with its rim 23 connected to one of the sections by means indicated at 24 and its inner portion 25 connected to the other section (as shown, the hollow "floating" one) by means indicated at 26. The peripheral connecting means 24 has the form of a sheet metal shell 27, with one end channeled or grooved at 28 to embrace and grip the rim 23, and the other end flanged inward at 29 for lateral attachment by bolts 30 to a disc or flange 31 on the end of the shaft 21. The nuts of the bolts 30 are preferably welded or otherwise secured to the flange 29, as indicated at 32. In the present instance, the member 20 is open at the center, and the central connecting means 26 has the form of a channeled or grooved hub 33 within it, with flanges 34, 35 embracing and gripping the inner disc periphery 25 tightly between them. As shown, the flange 34 is integral with the body of the hub 33, while the flange 35 forms part of a separate sleeve welded on.

Figure 2:
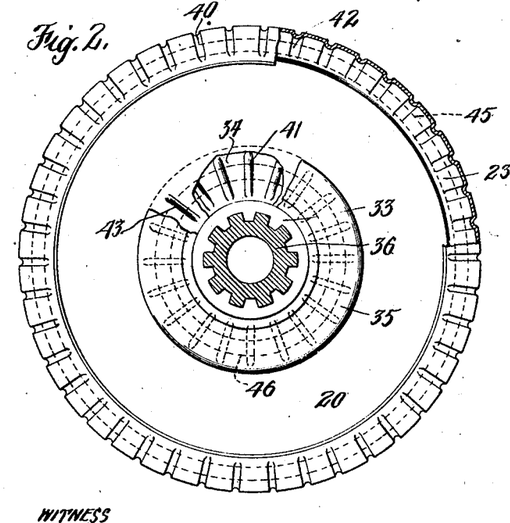
Fig. 2 shows a view of the joint from the right of Fig. 1, with one part in section, as indicated by the line 2—2 in Fig. 1, and with others partly broken away.

To permit ample freedom for relative longitudinal movement of the parts, a slip joint may be provided between the hub 33 and the end portion 36 of the shaft 22. As shown in Figs. 1 and 2, the shaft end 36 and the bore of the hub 33 have a tongue and groove configuration to afford longitudinally sliding and anti-turning engagement between them. The drum-like structure 24 affords ample space for endwise variation of the shaft 22 to compensate for chassis variations and facilitate assembly on the car. The slip joint at 33, 36 may be lubricated by making the shaft end 36 hollow, with one or more oil holes 37 out through its wall to the relatively moving surfaces, and from time to time filling the lubricant reservoir in the shaft end bore through a hole closed by a pipe plug 39.

However, the end play permitted by the flexible member 20 itself is so great that a slip joint will only be required in rather extreme cases.

To improve the hold of the connecting means 24, 26 on the member 20, the contact surfaces of the former may be appropriately conformed to the latter, and the parts may be roughened, deformed, or otherwise given a positive anti-turning interengagement. As here shown, the engagement means 28, 34, 35 are circumferentially coextensive with the rims 23, 25 and have ridges 40, 41 extending radially and transversely across the peripheral portions 23, 25, so as to bite into the latter. Preferably these portions 23, 25 are thickened, and the gripping channel or groove sides have a corresponding reentrant or overhung conformation, so as to give a greater area of contact and at the same time prevent the gripped material from squeezing out under the pressure. The ridges 40 of the outer gripping means 28 may be formed in the sheet metal either previously or at the same time the channel sides are brought into their final reentrantly gripping relations to the rim 23 under heavy pressure,—as by a die-pressing operation. The ridges 41 of the inner gripping means may be forged on the flanges 34, 35,—which will also be assembled with the member 20 and finally secured under pressure. The hold of the ridges or corrugations 40, 41 on the peripheries 23 and 25 may also be improved somewhat by preforming the latter with appropriate depressions 42, 43 to take the ridges, as shown in Fig. 2.

Figure 3:
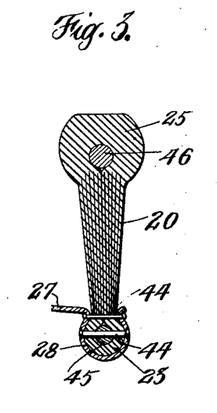
Fig. 3 is a fragmentary cross sectional view of the flexible structure and an associated part, on a larger scale than Figs. 1 and 2.

The hold of the gripping means 28 on the rim 23 may be made still stronger and surer by securing its sides together at suitable intervals, as by rivets 44 extending through the thickness of the member 20 (Fig. 3), so as to enable the sheet metal to sustain and exert greater pressure. As shown, the rivets 44 may extend either through the channel beads or lips at the base of the thickened rim 23, or through the rim 23 itself and a member 45 embedded and extending circumferentially therein as herein illustrated,—or both. As shown, the inner rim 25 also has a circumferentially extending member 46.

Figure 4:
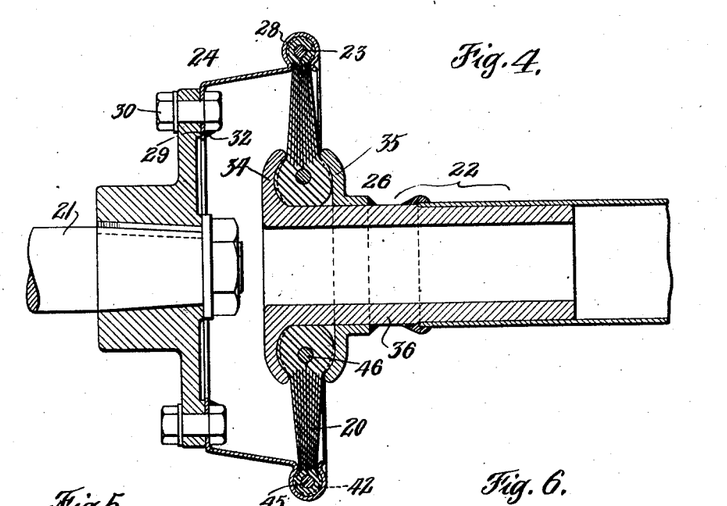
Fig. 4 is a view similar to Fig. 1, illustrating a somewhat simpler joint.

The construction shown in Fig. 4 differs from that of Figs. 1 and 2 in omitting the slip-joint feature. Accordingly, the gripping flanges 34, 35 are directly associated with the shaft end 36, which is thus in effect also the hub 33 of Fig. 1. Various parts and features are here marked with the same reference characters as in Figs. 1 and 2, as a means of dispensing with merely repetitive description.

Figures 5, 6:
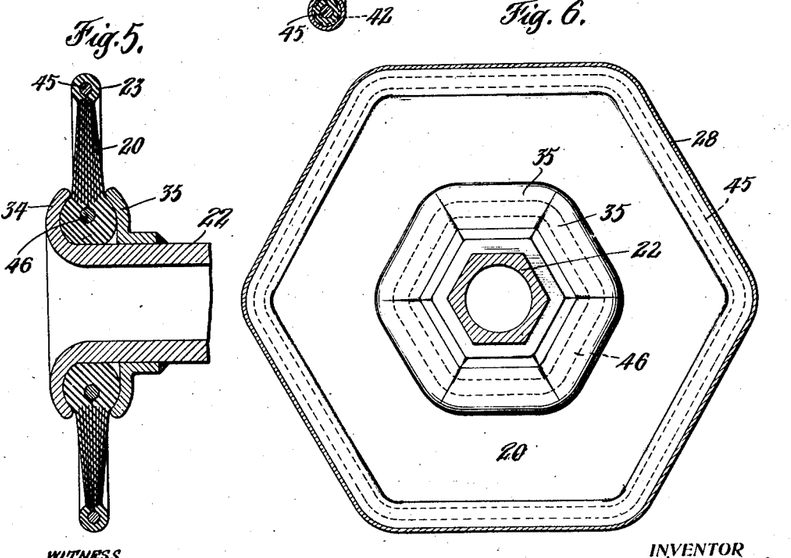
Fig. 5 is a fragmentary view similar to Figs. 1 and 4, illustrating a still simpler form of construction than shown in either of those figures.
Fig. 6 is a view generally similar to Fig. 2, illustrating different forms of various parts.

In Figs. 1 and 4, the shaft section 22 comprises a thin walled tube, and the stouter end portion 36 consists of a separate part inserted and secured in such tube—as by flanging over and welding the tube on a shoulder of the part 36 in Fig. 1, and by simply welding the tube end to an abutting shoulder in Fig. 4. In Fig. 5, the shaft section 22 is itself of ample thickness, and is simply forged out at one end to form the flange 34. Thus the shaft 22 replaces the separately forged end piece 36 of Figs. 1 and 4, as well as the hub 33 of Fig. 1. In manufacture, the parts 20 and 35 may be slipped over the end of the tube 22 before forging its flange at 34, and then brought back to place and secured under pressure. Here again, various parts and features are marked with the same reference characters as in Figs. 1 and 2, in order to dispense with repetitive description.

Fig. 6 illustrates a mode of conformity and positive anti-turning engagement between the gripping connective means 24, 26 and the rims 23, 25 different from that already described in connection with Figs. 1 and 2. In Fig. 2, the disc peripheries are circular. In Fig. 6, both peripheries of the member 20 are of anti-turning profile or outlines (polygonal) and the outer and inner connective means 24, 26 are of like outlines. However, the anti-turning engagement resulting from this conformity in the plane of revolution does not, of course, exclude other forms of positive anti-turning engagement or connection. Fig. 6 also shows a shaft end of polygonal form corresponding to that of the inner engagement means 26, and thus in itself affording effective anti-turning engagement for the latter in cases where a slip joint is to be provided. However, the polygonal features of Fig. 6 are equally applicable to constructions without slip joints, such as shown in Figs. 4 and 5. Once more various parts and features are marked with the reference characters used in Figs. 1 and 2, to avoid repetitive description.

Figures 7, 8, 9:
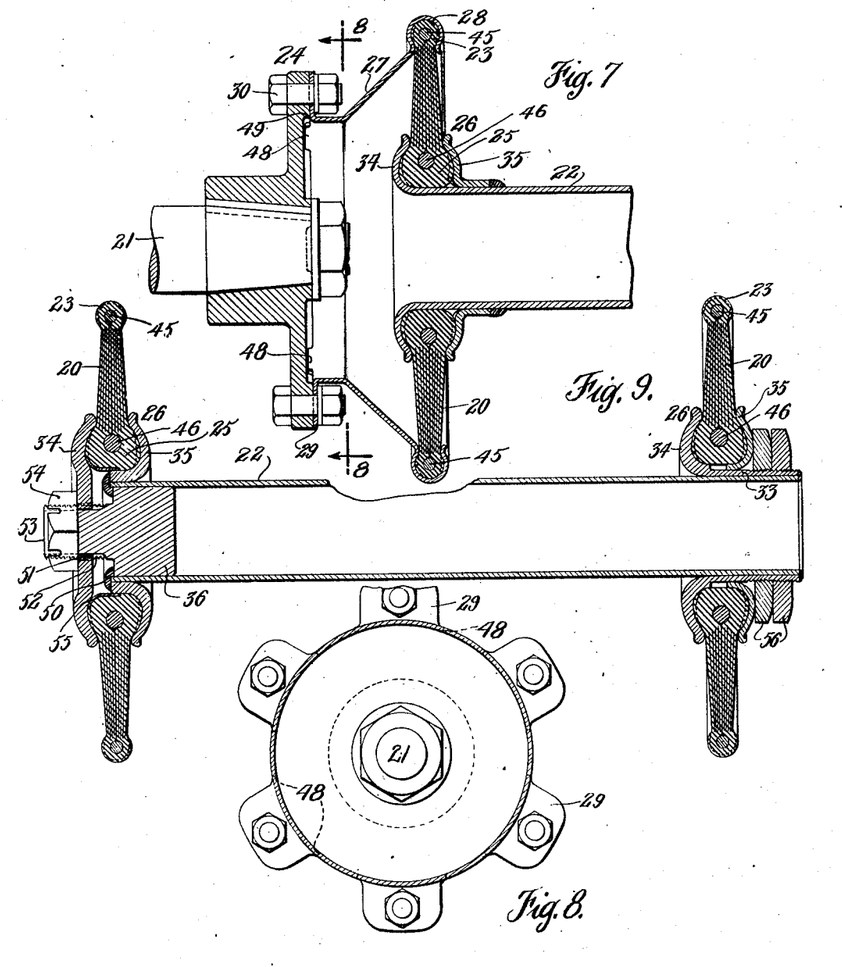
Fig. 7 is a view similar to Figs. 1 and 4, illustrating a still simpler joint embodying substantially the construction shown in Fig. 6.
Fig. 8 shows a section taken as indicated by the line 8—8 in Fig. 7.
Fig. 9 shows an axial section through a floating propeller shaft section with the associated flexible joint member attached, and illustrates provisions for adjustment of the grip or pressure on the inner disc peripheries.

Figs. 7 and 8 illustrate a construction like that of Fig. 5 with a rather thin-walled tubular shaft 22. As here shown, however, the construction of the connective means 24 differs from those of Figs. 1 and 4. The shell 27 is flanged outward at 29 instead of inward, so that the bolts 30 are much more readily accessible when the joint is being assembled in a car or taken down. Also, the flange 29 is not continuous, but consists rather of a plurality of separate outturned feet on the small end of the considerably flared shell 27. Between the feet 29, the smaller cylindrical end of the shell 27 extends beyond the feet 29, thus forming a similarly mutilated flange or series of lugs 48 for engaging inside a shoulder 49 formed by a recess in one side of the disc or flange 31, to center the shell 27 properly with reference to the shaft 21. In other respects, the joint may correspond either to Fig. 2 or to Fig. 6. Once again, various parts and features are marked with the reference characters used in Figs. 1 and 2, as a means of dispensing with merely repetitive description.

As shown in Figs. 1, 3, 4, 5 and 7, the flexible structure of member 20 is progressively thicker from the outside toward the center, more or less according to its corresponding circumferential diminution, so that its effective strength as against torsion will be more or less uniform throughout. It will also be seen from these figures and Figs. 2 and 6 how the circumferentially extending members 45 and 46 help to swell out and sustain the lateral protuberance of the peripheral portions, and thus anchor them more securely to the connecting means 24, 26, besides reinforcing them structurally and affording additional (internal) torque transmitting connection.

The construction shown in Fig. 9 differs from those of Figs. 1 to 8 as regards the way in which the gripping flanges 34, 35 are mounted and secured. Indeed, this is somewhat different at the two ends of the shaft 22.

At the left, the sleeve portion of the flange member 35 is turned the other way as compared with Fig. 7, and extends within the flexible disc opening at 25,—somewhat like the hub 33 of the flange 34 in Fig. 1. It is welded to the end of the hollow shaft 22 by the same weld 50 that secures the solid end piece 36 within the latter. These parts 35 and 36 are preferably forced on and into the shaft 22 with a driving fit so tight as in itself to resist relative rotation effectually. The flange member 34 is in effect a disc having a central opening provided with key projections 51 to engage in grooves 52 in the projecting shank 53 of the end piece 36, and is forced and held tight against the disc 20 by a castellated nut 54 screwed on the shank, and secured against working loose in any suitable manner. A sheet metal ring 55 fitting the disc opening at 25 closes the gap that would otherwise exist at the bottom of the corresponding driving channel between the parts 34 and 35, and prevents the disc portion 25 from squeezing into such gap.

At the right, the construction resembles that of Fig. 1, but lacks a slip joint. The hub 33 of the flange 34 is driven tight on the end of the shaft 22, and welded to its extremity. This hub 33 is externally screw threaded. The flange member 35 resembles that to the left of Fig. 9; however, it simply fits snug on the hub 33 and is forced and held tight against the disc 20 by lock nuts 56 screwed on said hub 33.

At either end of the shaft 22 of Fig. 9, therefore, the securing means 26 can be tightened up on the inner periphery 25 of the member 20 from time to time, to compensate for wear or softening of said member. Such adjustment will not usually be needed at the outer periphery 23, owing to the much greater area of gripping surface there.

Figure 10:
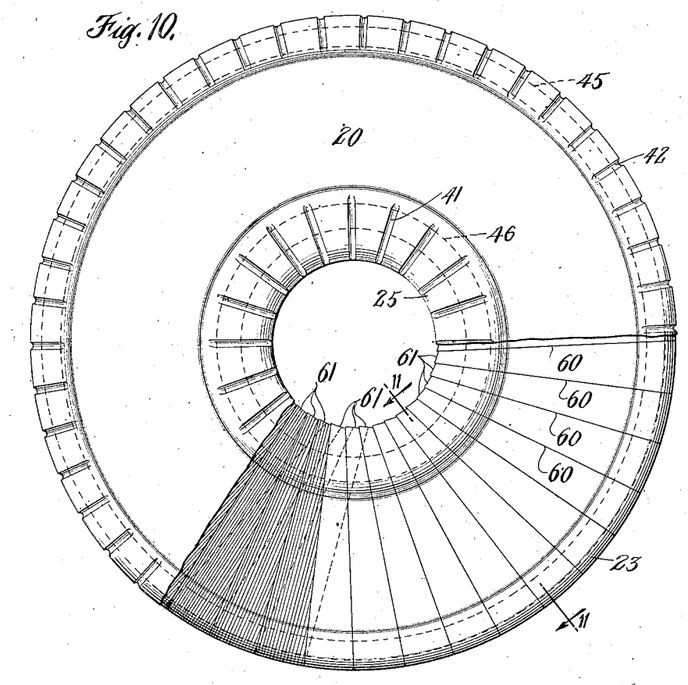
Fig. 10 is a side view of a flexible member for joint of the general type illustrated in Figs. 1 to 9, with part of its external layer removed to reveal underlying features.
Figures 11, 16, 17, 18, 19:
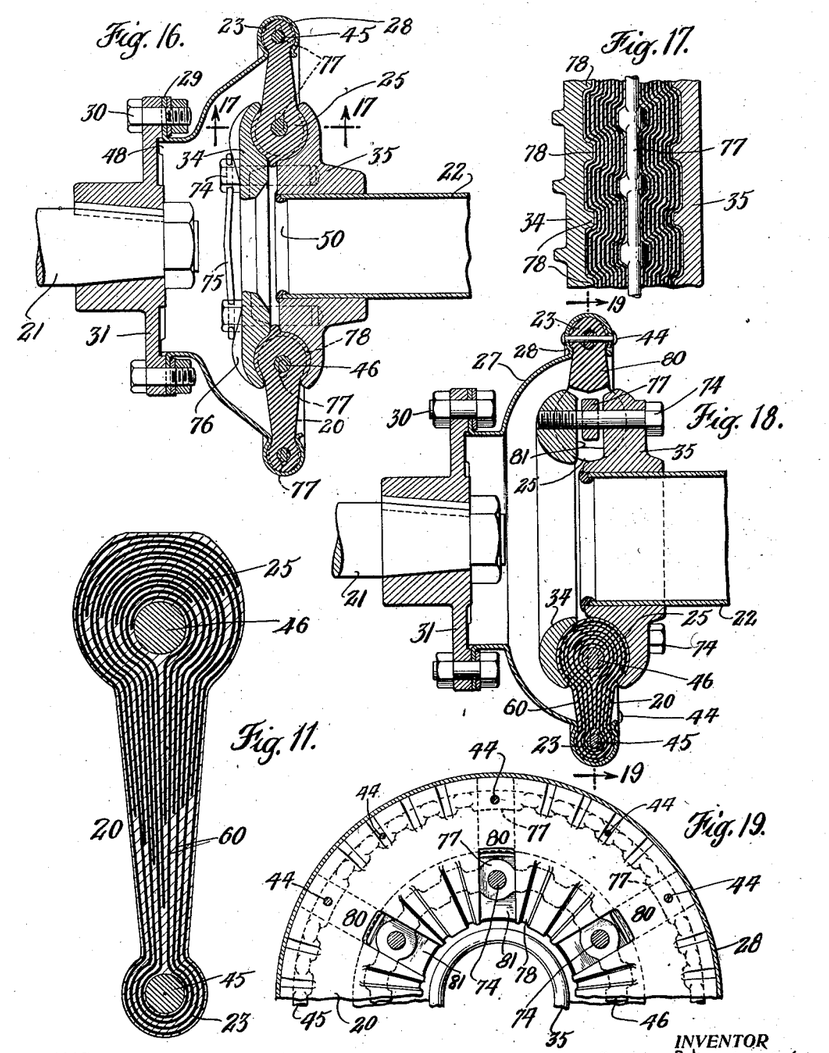
Fig. 11 shows a radial cross section through the flexible member Fig. 10, taken as indicated by the line 11—11 in Fig. 10, but on a larger scale than that figure.
Fig. 16 is a sectional view of a joint similar to that of Fig. 7, with provisions for adjustably gripping the flexible disc different from those shown in Fig. 9, as well as certain other variations.
Fig. 17 shows a development of a fragmentary circumferential section taken as indicated by the line 17—17 in Fig. 16.
Fig. 18 is a view similar to Fig. 16, illustrating further differences as regards the securing of the inner disc periphery.
Fig. 19 is a fragmentary side view of the disc shown in Fig. 18 and part of the gripping means, with the outer gripping means in section as indicated by the line 19—19 in Fig. 18.

Figs. 10 to 15 illustrate (with minor variations) a preferred mode of construction suitable for the flexible structure or member of Figs. 1 to 9. The particular structure 20 shown in Figs. 10 and 11 is circular like that of Fig. 2.

As shown in Figs. 10 and 11, the strength material employed comprises flexible elements 60 extending generally inward and outward from point to point around the joint, in a hollow configuration, converging toward its central region. In the present instance they all run substantially radially of the joint when unstressed. When the joint is in service, they are under tension between the members 24, 26 that they interconnect, with a tendency to deflect circumferentially one way or the other somewhat, according to the direction of rotation; so that under this condition, at any rate, they tend to lie at acute angles to the radial. (I. e., the direction of such deflection is reversed when the automobile is backing. The tensile stress on the strength elements 60, however, is not reversed.) The resistance of the strength elements 60 to circumferential deflection is low at first, but progressively increases (at a rapid rate) as the torque increases and each strength element changes or shifts from an initial right angle toward parallelism with the corresponding direction of torque stress. In other words, the disc is progressively "wound up", under stress, with an advantageous cushion effect. As here shown, there are several series or layers of the convergently ranged strength elements 60 lying one over the other, and each substantially without a gap all the way around the structure 20, even at its outer periphery. The strength elements 60 of each series lie in groups 61 of parallel individual threads or cords like the warps of tape or other fabric strip. For convenience in manufacture as hereinafter described, the cords of each such group 61 may be held together by binder warps, after the manner of cord fabric for automobile tires; but they are preferably without transverse threads in the ordinary textile sense. As shown in Fig. 11, the cords are folded back and forth to form elongated loops each including elements 60 in corresponding layers at opposite sides of a central plane, and embracing the interior layers; and the members 45, 46 extend through the bights of all the loops and serve to anchor them. In reference to this looped arrangement of the cords, these members 45, 46 may be regarded as the principal connective means of the joint.

In practice, the structure 20 may be fabricated by winding the cord tape 61 back and forth about and circumferentially around the concentric rings 45, 46 as a central supporting means, in a substantially uniform manner, preferably with the edges of successive loops or convolutions just touching at their outer bights. Owing to the smaller circumference of the inner ring 46, the successive tape convolutions 61 will necessarily overlap, "fanwise", more and more toward their inner bights, as shown in Fig. 10; and the disc 20 built up of the successive layers so wound will, therefore, increase in thickness toward the center substantially in proportion to the corresponding decrease in circumference,—and so be of uniform strength throughout. In other words, the strength elements in any radial section of the disc are inversely proportional in amount to the lever arm of the torque affecting them. The cords in various contiguous radial tape lengths 61 will overlap at acute angles determined by the relation of the tape width to the radii of the rings 45, 46. For any reasonable tape width, however, these angles will always be such as to afford mutual support and reinforcement of the cords without reciprocal sawing action at intersections. Owing to such mutual support amongst the cords, the structure 20 will have ample resistance to side pressure,—a quality in which it might tend to be deficient if there were no such angular overlapping.

In order to unify the flexible structure 20 as completely as possible, the cord tape 61 may be saturated or "calendered" with friction material (rubber) prior to winding. After the tape 61 has been wound, the whole structure 20 may be placed in a mold of suitable form and vulcanized, so as to press and consolidate it into one coherent, solid mass of the exact ultimate form desired,—all very much as in the manufacture of ordinary rubberized laminated fabric discs such as described above. By suitable preliminary treatment of the members 45, 46, they may be caused to adhere to the rubber during vulcanization. If the peripheries 23, 25 are to be deformed as at 42, 43 (Fig. 2) for cooperation with the gripping means 28, 34, 35, this conformation can be given the peripheries by the vulcanizing mold, as well as their protuberance.

It will be seen that besides pressing tightly on the ends of the radial strength elements 60 and gripping them on the sides of the rings 45, 46, the connective means 24, 26 also engage these strength elements inside the outer ring 45, and outside the inner one 46 (by virtue of the reentrant conformation of the driving grooves or channels at 28 and 34, 35), and even grip them tightly at these points. On the other hand, the members 45, 46 in the bights of the cord loops swell them out laterally and thus positively anchor the loops against pulling out of the reentrant-sided channels 28, 34, 35,—even regardless of clamping action and of the rubber. As shown in Figs. 1, 3, 4, 5, 7 and 9, the lips of the channels 28 and 34, 35 are eased or rounded to obviate any risk of their cutting the cords 60.

Figure 13:
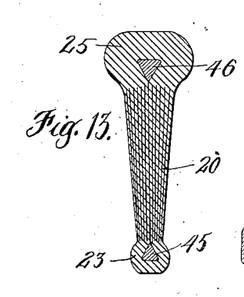
Fig. 13 is a fragmentary cross sectional view of a flexible member with a different form of reinforcement or anchorage.
Figures 14, 16:
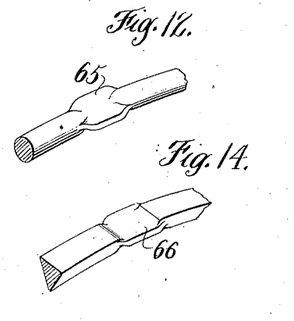
Fig. 14 is a view similar to Fig. 12, showing a portion of the reinforcement or anchorage that appears in section in Fig. 13.
Figure 15:
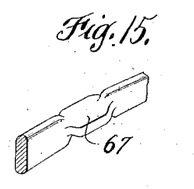
Fig. 15 is a view similar to Figs. 12 and 13, showing still another form of reinforcement or anchorage.

The members 45, 46 may have notches, projections or other irregularities or local deformations to resist circumferential displacement of the cord loops along them; and these may advantageously correspond in position to the anti-turning conformation of the gripping means 28, 34, 35, so as to cooperate therewith in preventing slippage of the disc, and also to facilitate like preconformation of the peripheries 23, 25 (as at 42, 43 in Fig. 2) in the vulcanizing mold, if desired. For this purpose, members 45, 46 of round wire (such as shown in Figs 1, 3, 4, 5, 7, 9 and 11) may be locally flattened, radially of the joint, as at 65 in Fig. 12, so as to present lateral projections. Members 45, 46 of triangular wire, such as shown in Fig. 13, may likewise be flattened radially, as at 66 in Fig. 14. (Such a triangular shape permits the cords to lie smooth and close in the mold, as well as in the member 20 when in service.) Or, again, if flat round-edged wire be used, it may be so arranged that its width shall lie radially of the joint, and squeezed out radially to a width (thickwise of the disc) about equal to its original width, as shown at 67 in Fig. 15,—or simply twisted 90° at proper points. "Flats" 67 about ½" long spaced 1" on centers would represent fair practice.

In cases where great elasticity is desired in the flexible structure 20, its strength material may consist of strips of textile fabric (preferably with warps and wefts just alike) cut on the bias at about 45°,—instead of weftless cord tape 51 such as described above. Otherwise, its mode of construction in such case need not differ from that above described. In such a flexible structure, of course, the fabric strip will be the ultimate strength element or unit, instead of the individual cord 60 of Figs. 1 and 11.

Figs. 16 and 17 show a construction resembling somewhat those of Figs. 7, 8, and 9, especially that at the left of Fig. 9. Here the end piece 36 of Fig. 9 is dispensed with, and the stout washer-like "flange" member 34 is forced and held tight against the flexible disc member 20 by a set of some four to six bolts or cap-screws 74 that take into tapped holes in the hub of the stout flange member 35. The screws 74 are locked in proper adjustment by a wire 75 extending through holes in their heads. Both flanges 34 and 35 are stouter and stiffer than in Fig. 7, so as to exert greater gripping force on the inner disc periphery 25, and the gripping portion of the flange 34 is reinforced with radial ribs 76 at its back. As shown, the round anchorages 45 and 46 are flattened in the plane of the disc and radially outward at 77,—instead of the other way, as at 65, 66, 67 in Figs. 12, 14 and 15,—and the gripping faces of the member 34, 35 have transverse ribs 78 that press the reinforcing material 60 into the anchorage notches or seats of the disc 20 corresponding to the flattening at 77. As indicated by the dotted lines in Fig. 16, these notches or seats extend all the way around the enlargement at the inner disc periphery 25. Also, the aperture and the inner periphery 25 are larger in proportion to the overall diameter than in Figs. 1 or 7, for example; and hence the gripping area is greater and the unit stresses are less. The joint is thus adapted for very heavy duty.

In Figs. 16 and 17 various parts and features are marked with the same reference characters as in Figs. 1 and 7 to 9, as a means of dispensing with repetitive description.

Figs. 18 and 19 show a construction quite similar to that of Figs. 16 and 17, but further modified. The disc 20 itself is more massive; rivets 44 extend through the outer gripping means 28 and the inward flattened portions 77 of the outer anchorage 45; and the cap screws or bolts 74 for the inner gripping means 34, 35 likewise extend through the extra large flattened portions 77 of the inner anchorage 46. As in Figs. 12, 14, 15, these anchorages or reinforcements 45, 46 may be made of wire of uniform section locally flattened. The holes for the securing means 44, 74 may be punched or "drifted" in the flats 77, without the greater expense of drilling or reaming. The arrangement allows considerable variation in the size of the shaft 22 to be taken care of by mere variation of the hole in the flange forging 35. As shown, the heads of the bolts 74 are exposed at the back of the flange 35, so that they can be tightened, on occasion, without taking down any part of the joint. In practice, the fabric reinforcement 60 may be omitted from the portions 80 of the member 20 in which are the bolts 74 and the rivets 44 above mentioned, and these portions (between the radial dotted lines) formed of friction material or rubber merely without fabric. If desired, some rivets 44 may also be provided at other points along the outer periphery 23, small enough (like those in Fig. 3) to pass between the cords 60 without cutting them. As shown, even the rubber may be omitted from the regions 80 at the inner peripheral portion 25, so as to afford recesses or seats 80 for correspondingly shaped radial ridges or lug members 81 on the gripping surfaces of the members 34, 35. Besides taking the bolts 74, these members 81 afford additional driving engagement for the inner disc periphery 25. In effect, it will be seen, the flexible disc member 20 of Figs. 18 and 19 consists of as many separate flexible segments as there are regions 80 without fabric reinforcement,—these segments being held together conveniently for assemblage of the joint by the rubber at the regions 80.

Owing to the positive metal to metal connection to the anchorages 45, 46 through the members 44, 74, this construction gives very effective internal connection to the disc and affords augmented metal to rubber driving surface. Hence it allows lower intensity of gripping pressure,—which pressure is extremely destructive to the fabric disc 20,— and is adapted to give long life under heavy duty.

In Figs. 18 and 19, again, the same reference characters as in other figures have been employed, in order to dispense with repetitive description.

What I claim is:

1. A torque transmitting flexible joint comprising a flexible disc of tensile cords and friction material increasing in thickness of the tensile cord material toward its center substantially in proportion to its corresponding circumferential diminution, in combination with connecting members secured to said disc at its center and along its periphery.

2. In a torque transmitting flexible joint, the combination of a flexible disc with channelled circumferential connecting means gripping the thickness of said disc at its periphery and in positive anti-turning engagement with the disc, and circumferentially extending reinforcement in the peripheral portion of the disc locally deformed to cooperate with said connecting means in preventing slippage of the disc therethrough.

3. A torque transmitting flexible joint comprising a series of cords ranged side by side in a hollow figure and running at acute angles to the radial, when under service stress, and gripped by connective means at the center and the periphery of the series.

4. A torque transmitting flexible joint comprising a series of divergent strength elements ranged in a hollow figure, and inner and outer connecting members gripping the inner and outer ends of said strength elements and thus interconnected by them.

5. A torque transmitting flexible joint comprising a series of cords running in a general radial direction and gripped by connective means at the center and the periphery of the series.

6. A torque transmitting flexible joint comprising inner and outer connecting members, with lengths of tape interconnecting them and overlapping fanwise.

7. A torque transmitting flexible joint comprising a series of convergently ranged tensile loops, and connective anchorage means extending along the series through the bights of the loops.

8. A torque transmitting flexible joint comprising inner and outer annular anchorages, cord extending back and forth about and circumferentially around said anchorages, and connecting means engaging the cord outside the inner anchorage and inside the outer one.

9. A torque transmitting flexible joint comprising inner and outer rings, cord extending back and forth about and circumferentially around said rings, and connecting means gripping the cord on each ring.

10. A torque transmitting flexible joint comprising inner and outer anchorages, cord tape wound back and forth about and circumferentially around said anchorages, in a series of convolutions convergent and increasingly overlapping toward the inner anchorage, and connecting means gripping the cord on each anchorage.

11. A flexible torque transmitting joint disc with circumferentially extending reinforcement in a peripheral portion locally deformed for anti-slipping cooperation with connective means engaging such peripheral portion.

12. A torque transmitting flexible joint member with its strength elements running in generally radial directions from point to point around it, and laterally protuberant gripping rims for connective means.

13. A flexible rubberized joint disc effectively transmitting heavy torque by virtue of a series of strength elements converging toward its center and successively overlapping at highly acute angles, so as to reinforce one another substantially without sawing action at their intersections.

14. A flexible rubberized torque transmitting joint disc comprising as its strength material a series of tape lengths converging toward its center.

15. A flexible torque transmitting joint member comprising convergently ranged overlapping tensile loops with inner and outer anchorage rings through their bights, and friction material uniting the loops.

16. A flexible torque transmitting joint structure comprising inner and outer rings interconnected by cord extending radially back and forth between and about the rings, and circumferentially around them.

17. A flexible torque transmitting joint structure comprising inner and outer anchorages and tape wound back and forth about and circumferentially around said anchorages, in a series of convolutions slightly converging and increasingly over-overlapping toward the center of the series.

18. The method of fabricating a flexible torque transmitting joint member which comprises ranging lengths of calendered strength material fanwise in a hollow series, successively overlapping at acute angles, and vulcanizing them together into a coherent structure.

19. The method of fabricating a flexible torque transmitting joint member which comprises folding calendered strength material back and forth in a series of convergent lengths ranged in hollow configuration, and vulcanizing them together into a coherent structure.

20. The method for fabrication of a flexible torque transmitting joint structure which comprises winding the strength material in a series of convergent loops ranged in hollow configuration and successively overlapping at acute angles.

21. The method for fabrication of a flexible torque transmitting joint structure which comprises winding the strength material back and forth about and circumferentially around annular supporting means.

22. The method of fabricating a flexible torque transmitting joint member which comprises winding calendered strength material back and forth about and circumferentially around annular anchorages, one within the other, and forming and vulcanizing the whole into a coherent disc with outer and inner rims laterally protuberant in correspondence with the presence of said anchorages.

23. In a torque transmitting flexible joint, the combination of a flexible disc with external recesses in its peripheral surface, connecting means gripping the disc periphery, and torque-transmitting members engaged in its aforesaid recesses.

24. In a torque transmitting flexible joint, the combination of a flexible disc, connecting members for gripping the disc periphery, and means embedded in the thickness of the disc affording internal torque transmitting connection to the disc through securing means holding said members together.

25. In a torque transmitting flexible joint, the combination of a flexible disc, connecting means gripping its periphery, and torque-transmitting reinforcement embedded in the disc periphery and in metal to metal connection with said connecting means.

26. A torque-transmitting peripheral reinforcement for a flexible disc comprising wire of uniform section locally flattened, with holes for torque-transmitting connecting means punched in such flattened portions.

In testimony whereof, I have hereunto signed my name.

ANGUS S. MACDONALD.